US010864689B2

(12) United States Patent
Techer et al.

(10) Patent No.: US 10,864,689 B2
(45) Date of Patent: Dec. 15, 2020

(54) METHOD FOR CHECKING THE POSITION OF A PREFORM IN A MOULD

(71) Applicant: Safran Aircraft Engines, Paris (FR)

(72) Inventors: Marc-Emmanuel Techer, Moissy-Cramayel (FR); Nicolas Ashtari, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 782 days.

(21) Appl. No.: 15/531,714

(22) PCT Filed: Nov. 24, 2015

(86) PCT No.: PCT/FR2015/053201
§ 371 (c)(1),
(2) Date: May 30, 2017

(87) PCT Pub. No.: WO2016/087747
PCT Pub. Date: Jun. 9, 2016

(65) Prior Publication Data
US 2017/0312998 A1     Nov. 2, 2017

(30) Foreign Application Priority Data
Dec. 2, 2014  (FR) ...................................... 14 61819

(51) Int. Cl.
*B29C 70/54* (2006.01)
*B29C 70/48* (2006.01)
(Continued)

(52) U.S. Cl.
CPC ............ *B29C 70/541* (2013.01); *B29B 11/16* (2013.01); *B29C 33/12* (2013.01); *B29C 33/306* (2013.01);
(Continued)

(58) Field of Classification Search
CPC ..... B29C 70/541; B29C 33/12; B29C 33/306; B29C 70/48; B29C 70/545; B29C 70/085;
(Continued)

(56) References Cited

U.S. PATENT DOCUMENTS

2007/0092379 A1* 4/2007 Coupe .................... B29C 70/48
416/241 R
2012/0267039 A1* 10/2012 Dambrine .............. B29C 70/48
156/148

FOREIGN PATENT DOCUMENTS

FR      2983113 A1    5/2013
FR      2985939 A1    7/2013

OTHER PUBLICATIONS

International Search Report with English language translation, dated Feb. 22, 2016, International Application No. PCT/FR2015/053201.

* cited by examiner

*Primary Examiner* — Stella K Yi
(74) *Attorney, Agent, or Firm* — Womble Bond Dickinson (US) LLP

(57) ABSTRACT

The invention relates to a method for manufacturing a turbine engine blade from a preform (10) of composite material polymerised in a mould comprising a lower part (16) and an upper part, comprising at least one closure step, during which the upper part of said mould is placed on the lower part (16) of the mould containing the preform (10). The method comprises, prior to said closure step, at least one sub-step of inserting a position marker (28) into the preform (10), at least one sub-step of compacting the preform using an insert (34) intended to be received in the upper part of the mould (18), and at least one sub-step of checking the position of the marker (28) relative to a reference mark (30) of said insert (34).

9 Claims, 2 Drawing Sheets

(51) Int. Cl.
*B29B 11/16* (2006.01)
*B29C 33/30* (2006.01)
*B29C 33/12* (2006.01)
*D03D 1/00* (2006.01)
*F01D 5/28* (2006.01)
*B29L 31/08* (2006.01)

(52) U.S. Cl.
CPC ............ *B29C 70/48* (2013.01); *B29C 70/545* (2013.01); *D03D 1/00* (2013.01); *F01D 5/282* (2013.01); *B29C 2793/009* (2013.01); *B29K 2713/00* (2013.01); *B29L 2031/08* (2013.01); *B29L 2031/082* (2013.01); *F05D 2230/20* (2013.01); *F05D 2300/6034* (2013.01)

(58) Field of Classification Search
CPC ... B29C 70/205; B29C 70/222; B29C 70/224; B29C 70/226; B29C 70/228; B29C 70/24; B29C 70/36; B29C 70/443; B29C 70/467; B29C 65/344; B29C 65/364; B29C 2043/3602; B29C 33/14; B29B 11/16; D03D 1/00; F01D 5/282
See application file for complete search history.

METHOD FOR CHECKING THE POSITION OF A PREFORM IN A MOULD

The field of the present invention is that of manufacturing gas turbine engines, such as turbine engines, and in particular those intended to propel aircraft.

More specifically, the present invention relates to a method for manufacturing a turbine engine blade from composite material, to a preform intended to form the turbine engine blade and to a mould for executing such a method.

A turbine engine blade conventionally has a root and a vane, the root comprising slanting lateral faces connected to the blade and intended to form support surfaces in a rotor disc assembly chamber. The blade is generally made from light materials to help reduce the weight of the turbine engine and to limit the inertia of the rotor to which it belongs.

A turbine engine blade also experiences particularly high stresses at the root thereof, particularly on the support surfaces. Indeed, the forces exerted on the airflow by the vane, in the zone radially outside the vane, generates high stresses on the attachment zone thereof, i.e. in the root of the blade. This results in the use of a material for manufacturing the blade that is both light and resistant.

A known solution to these stresses involves using a composite material. Therefore, it is known for a blade to be produced using a preform formed by weaving fibres, said fibres being compacted and embedded in a matrix of heat-setting resin. The fibres thus provide the mechanical strengthening function, with the resin matrix ensuring that the blade is held in position.

The document EP-A1-1526285, in the name of the Applicant, discloses a method for manufacturing a preform by weaving fibres, particularly carbon fibres, in three dimensions. The preform that is thus obtained comprises a root part and a blade part, connected by slanting lateral faces intended to form support surfaces for the root in a rotor disc assembly chamber.

The document EP-A1-1777063, also in the name of the Applicant, discloses a method for manufacturing a turbine engine blade, successively comprising steps of producing a preform by weaving fibres in three dimensions, cutting the preform, preforming the preform, then compacting and rigidifying the preform. The preform is then arranged in a mould, the recess of which comprises a root zone and a vane zone, which are interconnected by slanting lateral faces that correspond to the aforementioned lateral faces of the preform, then a resin is injected into the mould, and the blade is taken out of the mould following resin polymerisation.

However, after the weaving step, the thickness of the preform is greater than the nominal thickness of the finished part, so as to obtain the desired fibre content for the part after the resin injection step. It is then said to be expanded.

On completion of the steps of preforming, compacting and rigidifying the preform, and prior to the injection step, the preform is not fully compacted. For example, at the end of these steps, the preform is only 80% compacted. It will only be finally 100% compacted when the injection tool is closed.

The document FR-A1-2983113 discloses a method for manufacturing a turbine engine blade, in which the preform is compacted in an injection mould comprising a lower part and an upper part. To this end, the preform is arranged in the lower part of the mould, the mould is then closed by placing the upper part of the mould on the lower part, transversely to the longitudinal axis of the blade, and the root of the preform is axially compressed using a movable part of the mould, which is interposed between the lower and upper parts. The purpose of this movable part is to force the fibres of the root of the preform to press against the slanting faces of the mould.

A partial vacuum is then created in the mould, and a heat-setting resin is injected into the mould so as to impregnate the entire preform.

The preform and the resin are then heated in order to polymerise, and thus harden, the resin. The fibres are then held in position by the resin matrix, and the assembly forms a blade, which is both light and rigid. Pressing fibres of the preform against the slanting lateral faces of the mould allows any hollows to be limited in the zones thereof that are intended to form the support surfaces of the root in a rotor disc assembly chamber.

However, it has been noted that a significant source of faults resides in the positioning of the fabric preform in the lower part of the mould.

Indeed, positioning this fabric preform in the injection mould is difficult but essential. However, closing the upper part of the mould is likely to apply a force to the preform, which can tend to shift in the mould and move to an incorrect position. Therefore, the preform may no longer be locally pressed against the walls of the mould and, for this reason, the surface of the blade risks having, following the injection of the resin, deposits or pockets of resin corresponding to the zones that were not occupied by the weave.

The mechanical resistance of these zones is less than that which is normally required for such a blade, and for this reason it is imperative that the presence of such deposits or pockets of resin is avoided.

Indeed, incorrect positioning of the preform fabric can only be observed after injecting the part and removing said part from the mould. It is then not possible to carry out any repair procedure, and the part must be rejected.

The document FR-A1-2985939 discloses a method for manufacturing a blade comprising a vane, in which a spar is received that is rigidly connected to a blade root. Once these elements are assembled, the position of the vane in a half-mould is adjusted by aligning a laser beam with sights formed in the vane. The vane is then clamped in the half-mould on the periphery thereof. As the laser beam is positioned above the tool, this technology cannot be applied to a two-part mould and, furthermore, it is particularly costly.

The invention overcomes this disadvantage by proposing a manufacturing method that allows the position of the preform in the mould to be determined before injection in order to prevent any error in positioning.

Therefore, the invention proposes a method for manufacturing a turbine engine blade from composite material comprising:

- a first step of producing a preform having a general longitudinal orientation by weaving a single piece, said weave being a three-dimensional yarn weave, said preform comprising a blade root part and a blade vane part;
- a second step of placing the preform in a lower part of a mould, a recess of which substantially matches lower parts of the blade root part and of the blade vane part of the preform, the blade root part being received with a longitudinal clearance relative to the lower part of the mould;
- a third step of closing the mould, which step consists in placing an upper part of said mould, a recess of which matches upper parts of the blade root part and of the blade vane part of the preform, on the lower part of the mould containing the preform;

a fourth step of vacuum injecting a resin into the mould with a view to impregnating the preform and to forming a rigid blade following resin polymerisation.

According to the invention, this method is characterised in that it comprises:

during the first step, at least one sub-step of inserting a position marker into the preform;

during the second step, at least one sub-step of fitting an insert into the mould forming a reference mark, the position of said insert being clearly defined relative to the lower part of the mould, at least one sub-step of compacting the preform in said mould using said insert, and at least one sub-step of checking the position of the marker relative to said reference mark.

According to further features of the method:

during the checking sub-step, the position of the marker relative to the reference mark of the insert is optically checked;

during the checking sub-step, the position of the marker is visually checked by an operator;

the checking sub-step comprises at least the visual measurement of the position of the marker relative to a wall of the insert in the general longitudinal direction of the preform of the blade, said wall determining the reference mark of the mould;

the first step of producing the preform comprises at least one sub-step of prior compacting of said preform.

The invention further proposes a blade preform obtained by weaving a single piece, said weaving being a three-dimensional yarn weave, said preform comprising a blade root part and a blade vane part.

According to the invention, this blade preform is characterised in that it comprises a position marker inserted into the weave of said preform.

According to further features of the preform:

the blade root part of the preform comprises a zone configured to undergo a cutting operation to obtain the finished blade, and in that said position marker of said preform is inserted into said zone;

the marker is a yarn having a different colour to that of the yarns used to weave the preform;

the marker is a glass fibre or else Kevlar yarn in the weave of the preform yarns, which are carbon fibres.

Finally, the invention proposes an impregnation mould for manufacturing a blade from composite material for a turbine engine, comprising a lower mould part having a recess of substantially longitudinal orientation that substantially matches a lower part of a blade preform, and an upper part having a recess of substantially longitudinal orientation that substantially matches an upper part of the blade preform, said upper part being able to be placed on said lower part.

According to the invention, this mould is characterised in that it comprises an insert which is intended to be fixed by a first end in a clear position relative to the lower part of the mould, and which is intended to extend substantially longitudinally above the recess of the lower part of the mould. This insert comprises at least one second opposite end comprising at least one transverse wall able to form a reference mark when the upper part of the mould is not placed on said lower part of the mould, and it is able to be fully received in a matching cavity of an upper part of the mould when said upper part is placed on said lower part. This insert further comprises a wall flush with the inside of the recess of said upper part, which wall is configured to define part of said recess of said upper part and to compact the preform inside said mould.

The invention will be better understood and further details, features and advantages of the present invention will become more clearly apparent upon reading the following description, which is provided by way of a non-limiting example, and with reference to the accompanying drawings, in which.

Throughout the following description, identical reference numerals denote identical parts or parts having similar functions.

Figure 1:
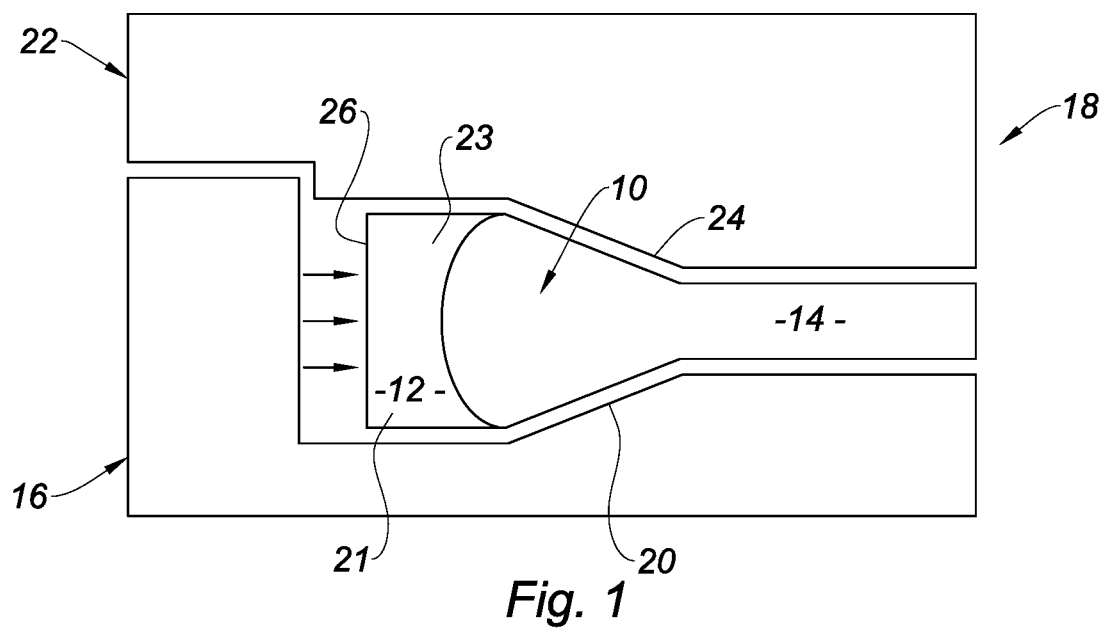
FIG. 1 is a schematic sectional view showing the third step of closing a mould from a moulding method according to the prior art.
Figure 2:
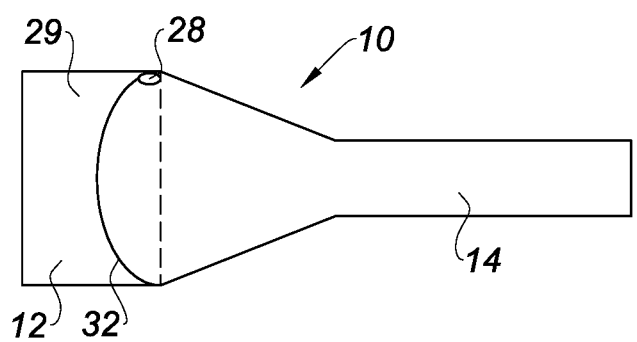
FIG. 2 is a schematic view of a preform in the state thereof at the end of the sub-step of inserting a marker into said preform according to the method of the invention.

FIG. 1 shows a method for manufacturing a turbine engine blade from composite material according to the prior art. This method comprises a first step, during which a preform is produced, as shown in FIG. 2, by three-dimensional yarn weaving (not shown). Such a preform 10 has a general longitudinal orientation that corresponds to the horizontal direction of FIG. 1.

The preform 10 is produced by weaving a single piece, generally made of carbon fibres, and it basically comprises a blade root part 12, which is intended to ensure the attachment of the finished blade to a turbine engine rotor disc, and a blade vane part 14, which is intended to cooperate with an airflow or gas inside the turbine engine.

In a second step of this method, the preform 10 is placed in a lower part 16 of a mould 18, such as that shown in FIG. 1. The lower part 16 comprises a recess 20 that substantially matches a lower part 21 of the preform, i.e. lower parts of the blade root part 12 and of the blade vane part 14 of the preform 10.

The mould 18 comprises an upper part 22 that is placed on the lower part 16 during a third step of closing the mould 18. This upper part 22 comprises a recess 24 that matches an upper part 23 of the preform 10, i.e. upper parts of the blade root part 12 and of the blade vane part 14 of the preform 10. Closing the mould 18 allows a complete recess to be delimited, which is made up of the recess 20 and of the recess 24, which allows resin to be injected into the preform 10.

The method then comprises a fourth step of compacting the preform 10 inside said mould 18. During this step, as shown in FIG. 1, a force is generally exerted on an end 26 of the root 12 of the preform, in order to compact the fibres in contact with the walls of the recesses 20 and 24, as shown by the arrows in FIG. 1.

Then, during a fifth injection step, a resin is vacuum injected into the mould 18 with a view to impregnating the compacted preform 10, which allows a rigid blade to be formed following resin polymerisation.

Finally, during a sixth finishing step, the rough, polymerised preform 10 is removed from the mould and is then cut to remove waste products, in order to obtain the final blade. In particular, many waste products are arranged in the vicinity of the free end 26 of the root 12. To this end, the blade is cut for example along the solid line 32 of FIG. 2, in order to cut a zone 29 of the blade root part 12 of the preform 10 that is between the line 32 and the free end 26 of the root.

It has been noted that correct positioning of the fabric preform in the recess 20 of the lower part 16 of the mould 18 is an essential condition for obtaining a finished blade having optimal resistance characteristics. Indeed, incorrect positioning of the fabric preform in the lower part of the mould 18 can result in the preform 10 no longer being pressed against the walls of the mould 18 and, for this reason, the surface of the blade risks having, after the resin is injected, deposits or pockets of resin corresponding to the zones that have not been occupied by the weave.

However, incorrect positioning is not necessarily visible when the operator arranges the preform 10 in the recess 20 in the lower part 16 of the mould 18. Indeed, incorrect positioning that cannot be seen, when closing the mould 18, can cause forces to occur that are exerted by the upper part 22 of the mould 18 on the preform 10, which forces tend to cause said preform to move in the mould before the resin is injected. Therefore, the preform 10 is most likely to move when the upper part 22 of the mould 18 is lowered onto the lower part 16, without the operator perceiving this movement.

The invention overcomes this disadvantage by proposing a manufacturing method allowing the positioning of the preform 10 inside the mould 18 to be checked before the resin is injected.

Figure 3:
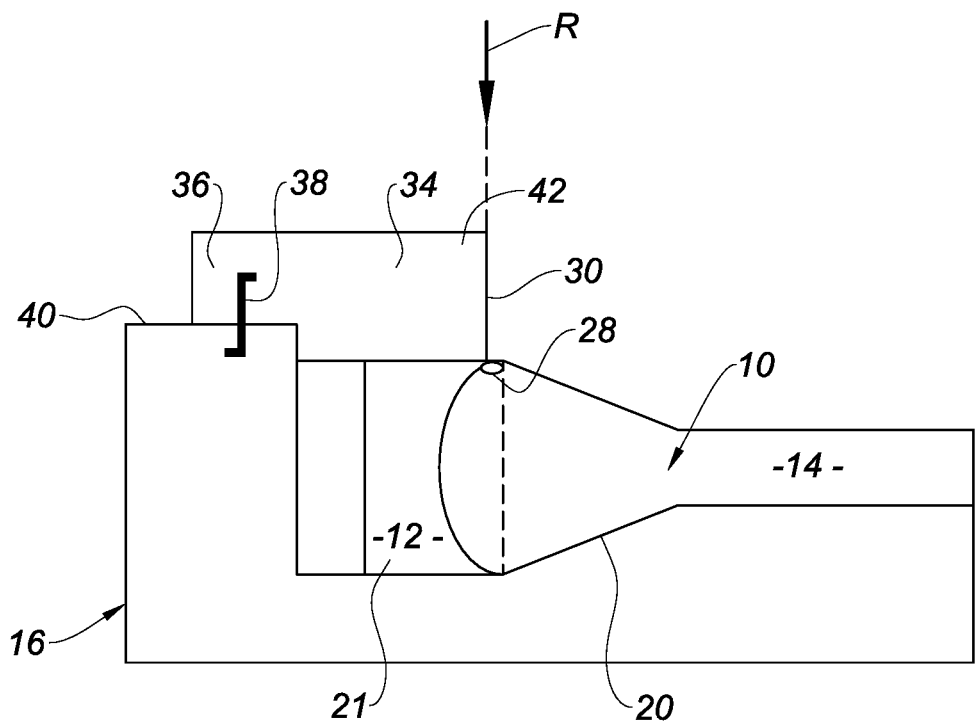
FIG. 3 is a schematic sectional view showing the sub-step of compacting the preform in the mould using said insert and the sub-step of checking the position of the marker relative to a reference mark in the mould according to the method of the invention.
Figure 4:
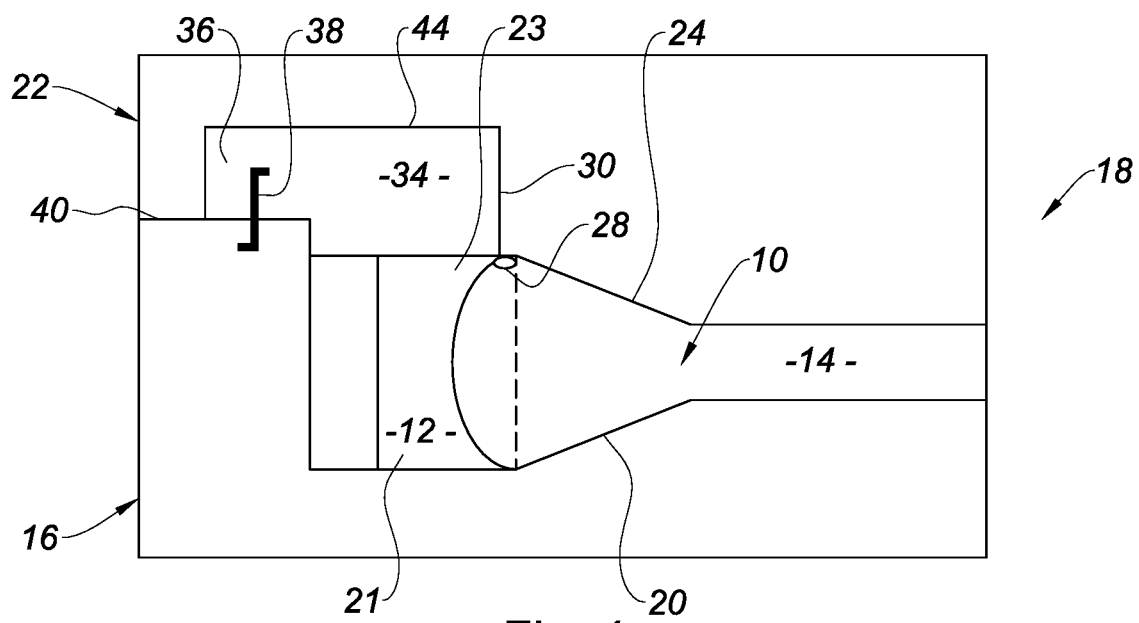
FIG. 4 is a schematic sectional view showing the third step of closing the mould according to the method of the invention.

To this end, the invention proposes a method that has been shown in FIGS. 3 and 4.

As is the case for the method previously described with reference to the prior art, the method comprises a first step, during which a preform 10 is produced by weaving a single piece, generally made of carbon fibres, said preform comprising a blade root part 12, which is intended to ensure the attachment of the finished blade to a turbine engine rotor disc, and a blade vane part 14, which is intended to cooperate with an airflow or gas inside the turbine engine.

The method according to the invention comprises a second step of installing the preform 10 in the lower part 16 of the mould 18, and a third step of closing the mould 18, similarly to the method known from the prior art.

The method according to the invention comprises a fourth step of vacuum injecting a resin into the mould 18, which resin is intended to impregnate the preform 10 and to form a rigid blade following resin polymerisation. This fourth step is similar to the fifth step of the method known from the prior art.

The method according to the invention differs from the method known from the prior art in terms of the compacting of the preform 10 and the positioning thereof in the lower part 16 of the mould 18.

According to the invention, during the first step, the method comprises at least one sub-step of inserting a position marker 28 into the preform 10, then, during the second step, at least one sub-step of fitting an insert 34 into the mould 18 forming a reference mark 30 relative to the mould 18, at least one sub-step of compacting the preform 10 inside said mould 18 using said insert 34, and at least one sub-step of checking the position of the marker 28 relative to said reference mark 30. The position of the insert 34 is clearly defined relative to the lower part 16 of the mould 18 in order to form a reference mark 30, the position of which relative to the mould 18 is known.

In order to implement this method, a preform of the type shown in FIG. 2 needs to be used. The preform 10 is a preform conventionally comprising a blade root part 12 and a blade vane part 14, obtained as a single piece by weaving yarns, for example carbon yarns, in three dimensions.

According to the invention, the preform 10 used in the method of the invention comprises a position marker 28 that is inserted into the weave of said preform 10 when it is manufactured. Inserting the marker 28 at this stage makes it possible to avoid a subsequent marker 28 insertion operation, which operation would risk damaging the weave of the preform 10 and, moreover, allows said marker 28 to be included in the weave of the preform, so that it does not project and so that the preform 10 does not exhibit any roughness, which could hinder its contact with the walls of the mould. The position marker 28 is inserted into the blade root part 12 of the preform 10.

In a manner not limiting the invention, the preform 10 can comprise other position markers 28.

In a manner also not limiting the invention, the marker can be placed in a zone of the blade root part 12 of the preform 10 that is intended to undergo a cutting operation in order to obtain the finished blade, which zone is similar to the zone 29 described with reference to FIG. 2.

Advantageously, a simple embodiment of the marker 28 involves using, for the production thereof, a yarn having a different colour to that of the yarns used for the weave of the preform 10, which yarn is inserted into the weave of the preform 10. Firstly, this allows a homogenous weave to be provided and, secondly, it allows an optical sight to be formed on the surface of the preform 10.

For example, the marker 28 is a glass fibre or, optionally, Kevlar yarn.

It thus can be understood that, during the checking sub-step, the position of the marker 28 is optically checked, i.e. the marker 28 is intended to form a sight, the presence, absence or position of which relative to the fixed reference mark 30 of the mould 28 is likely to be detected by any method that uses the reflection of light rays on the surface of the marker 28.

Therefore, in the preferred embodiment of the invention, during the checking sub-step, the position of the marker 28 is visually checked in a very simple manner by an operator.

To this end, during the second step, prior to the checking sub-step, the method comprises a sub-step of fitting an insert 34 into the mould forming a reference mark, the position of said insert 34 being clearly defined relative to the lower part 16 of the mould 18.

For example, as shown in FIG. 3, the insert 34 comprises a first end 36, by which it is fixed using a connection means 38, such as a screw or a tie rod, to the lower part 16 of the mould 18. For example, in a manner not limiting the invention, the insert 34 is fixed to an upper face 40 of the lower part 16 of the mould 18. The insert 34 is fixed in a clear position relative to the lower part 16 of the mould 18, so that the position thereof is known and fixed.

The insert 34 is fixed to the lower part 16 of the mould 18 after the preform 10 is introduced into the lower part 16 of the mould 18.

The insert 34 extends substantially longitudinally above the recess 20 of the lower part 16 of the mould 18.

The insert 34 comprises a lower wall 41 that is configured to be arranged in contact with the preform 10 in order ensure the compacting thereof. Preferably, the lower wall 41 is configured to ensure the compacting of the blade root part 12 of the preform 10. This configuration is not intended to limit the invention. However, it has been observed that this blade root part 12 of the preform 10 is thicker and thus it is this part that must be compacted as a priority.

The insert 34 comprises at least one second opposite end 42 forming the reference mark 30. This end 42 comprises at least one transverse wall 30 able to form the reference mark 30, while the upper part 22 of the mould 18, shown in FIG. 4, is not placed on said lower part 16 of the mould 18. Comparing the position of the marker 28 of the preform 10 with the reference mark 30 makes it possible to check the correct positioning of the preform 10 following the compacting of the blade root part 12 thereof by the insert 34.

In order to complete the sub-step of checking the position of the marker 28 relative to the reference mark 30 of the mould 18, an operator can, for example, look in the direction of the arrow "R" and note the position of the marker 28.

In this case, multiple measurement methods can be contemplated depending on the positioning tolerances of the marker 28.

According to a design that involves exact positioning, the position of the marker 28 is considered to be correct only when said marker is aligned with the transverse wall 30 of the insert 34. In this case, any deviation of the marker 28 from this position, particularly when marker moves away from the wall 30, towards the right in FIG. 3, or disappears under the insert 34, towards the left in FIG. 3, is synonymous with incorrect positioning.

It is to be noted that, according to this design, the transverse wall 30 of the insert advantageously can be replaced by a vertical well or a hole (not shown) formed in a longer insert 34, the correct position of the marker 28 then corresponding to the alignment of this well or hole with the marker 28. In this case, it is the absence of the marker 28 opposite this well or hole that indicates the positioning error of the preform 10. It will be noted that in this event, this well or hole must be plugged prior to injection so as to prevent resin from penetrating the well or the hole when it is injected, which penetration could generate a fault on the surface of the part. For example, it is possible for the well or the hole to be designed to receive a transparent material such as glass, allowing the position of the marker 28 of the preform 10 to be examined, whilst preventing any ingress of the resin into this well or hole.

According to a design that involves positioning within a determined range of values, the position of the marker 28 is considered to be correct within a determined range of values. The operator is then responsible for measuring the distance between the marker 28 and the wall 30 and for determining whether this position, in the general longitudinal direction of the preform of the blade, is within the range of values corresponding to correct positioning of the preform.

It will be understood that, according to other designs, checking the position of the marker 28 can be carried out in an optical and assisted, even automated, manner, but not in a directly visual manner.

Therefore, it is also possible for the exact positioning of the marker 28 to be checked using a monochromatic or laser light beam emitted in the direction "R" or in a transverse plane containing the direction "R", the reflection of the beam on the marker 28 and the capturing of the reflected beam corresponding to the correct positioning of the marker 28 and thus to the correct positioning of the preform 10, whereas conversely, the absorption of the beam by the carbon fibres of the preform 10 corresponds to incorrect positioning of the preform 10.

Similarly, an optical measurement can be carried out using a camera placed in the direction "R", the image of which is processed by a suitable algorithm in order to determine, according to the contemplated tolerances, whether the position of the marker 28 is strictly followed or whether it belongs to a determined range of values associated with the validation of the positioning of the preform.

More generally, it will be understood that any optical or visual measurement method can be suitable for implementing the sub-step of checking the position of the marker 28 relative to the wall 30 forming the reference mark of the mould 18.

As has been seen, during a third step of closing the mould, an upper part 22 of said mould 18 is placed on the lower part 16 of the mould 18 containing the preform 10.

Advantageously, the insert 34 is able to be fully received in a matching cavity 44 of the upper part 22 of the mould 18 when said upper part 18 is placed on the lower part 16. The insert 34 is then flush with the inside of the cavity 24 of the upper part 22, so that the lower wall 41 thereof defines part of said cavity 24.

This configuration makes it possible to avoid removing the insert 34, which operation would, firstly, be time-consuming and pointless, and, secondly, would risk causing the preform 10 to move in the lower part 16 of the mould 18.

Then, during a fourth step, a resin is vacuum injected into the mould 18 with a view to impregnating the preform 10 and to forming a rigid blade following resin polymerisation.

It will be noted that the method according to the invention allows the preform 10 to be compacted using the insert 34. However, compacting the preform 10 is preferably not carried out only by the insert 34.

Therefore, the first step of producing the preform 10 comprises at least one sub-step of prior compacting of the preform 10. Preferably, the compacting rate of the preform 10 during this sub-step is high. For example, 80% of the compacting of the preform 10 is carried out during this operation. Therefore, a substantially rigid preform 10 is introduced into the lower part 16 of the mould 18. Positioning the insert 34 then allows the remaining 20% of the compacting to be completed.

Therefore, the invention proposes a particularly simple and advantageous method that makes it possible to check any unwanted displacements of a weaved preform 10 in a mould 18 during a method for moulding a blade by resin injection and, consequently, to limit the faults that can cause the blade to be rejected. Given the high polymerisation duration of such a blade, the use of this method, by drastically reducing the number of rejected blades, makes it possible to significantly increase the production of turbine engine blades.

The invention claimed is:

1. A method for manufacturing a turbine engine blade from composite material comprising:
    a first step of producing a preform having a general longitudinal orientation by weaving a single piece, said weave being a three-dimensional yarn weave, said preform comprising a blade root part and a blade vane part;
    a second step of placing the preform in a lower part of a mould, a recess of which substantially matches lower parts of the blade root part and of the blade vane part of the preform, the blade root part being received with a longitudinal clearance relative to the lower part of the mould;
    a third step of closing the mould, which step consists in placing an upper part of said mould, a recess of which matches upper parts of the blade root part and of the blade vane part of the preform, on the lower part of the mould containing the preform;

a fourth step of vacuum injecting a resin into the mould with a view to impregnating the preform and to forming a rigid blade following resin polymerisation, wherein it comprises:

during the first step, at least one sub-step of inserting a position marker into the preform;

during the second step, at least one sub-step of fitting an insert into the mould forming a reference mark, the position of said insert being clearly defined relative to the lower part of the mould, at least one sub-step of compacting the preform in said mould using said insert, and at least one sub-step of checking the position of the marker relative to said reference mark.

2. The manufacturing method according to claim 1, wherein, during the at least one sub-step of checking, the position of the marker relative to the reference mark of the insert is optically checked.

3. The manufacturing method according to claim 2, wherein, during the at least one sub-step of checking, the position of the marker is visually checked by an operator.

4. The manufacturing method according to claim 3, wherein the at least one sub-step of checking comprises at least the visual measurement of the position of the marker relative to a wall of the insert in the general longitudinal direction of the preform of the blade, said wall determining the reference mark of the mould.

5. The manufacturing method according to claim 1, wherein the first step of producing the preform comprises at least one sub-step of prior compacting of said preform.

6. A blade preform obtained by weaving a single piece, said weave being a three-dimensional yarn weave, said preform comprising a blade root part and a blade vane part, wherein it comprises a position marker inserted into the weave of said preform and wherein the blade root part of the preform comprises a zone configured to undergo a cutting operation to obtain a finished blade, and in that said position marker of said preform is inserted into said zone.

7. The blade preform according to claim 6, wherein the position marker is a yarn having a different colour to that of the three-dimensional yarns weave used to weave the preform.

8. The blade preform according to claim 6, wherein the position marker is a glass fibre or Kevlar yarn in the weave of the preform, which are carbon fibres.

9. An impregnation mould for manufacturing a blade from composite material for a turbine engine, comprising a lower mould part having a recess of substantially longitudinal orientation that substantially matches a lower part of a blade preform, and an upper part having a recess of substantially longitudinal orientation that substantially matches an upper part of the blade preform, said upper part being able to be placed on said lower part, wherein it comprises an insert, which is intended to be fixed by a first end in a clear position relative to the lower part of the mould, which is intended to extend substantially longitudinally above the recess of the lower part of the mould, which comprises at least one second opposite end comprising at least one transverse wall able to form a reference mark when the upper part of the mould is not placed on said lower part of the mould, which is able to be fully received in a matching cavity of an upper part of the mould when said upper part is placed on said lower part, and which comprises at least one wall flush with the inside of the recess of said upper part, which wall is configured to define part of said recess of said upper part and to compact the preform inside said mould.

* * * * *